(No Model.)  G. T. FARNELL.  5 Sheets—Sheet 1.
MONEY CHANGER.

No. 569,912.  Patented Oct. 20, 1896.

WITNESSES.
M. S. Blundell
Jos. A. Ryan

INVENTOR
G. T. Farnell.
BY Munn & Co
ATTORNEYS.

(No Model.)

G. T. FARNELL.
MONEY CHANGER.

No. 569,912.

Patented Oct. 20, 1896.

5 Sheets—Sheet 2.

WITNESSES:
M. D. Blondel
Jos. A. Ryan

INVENTOR
G. T. Farnell.
BY Munn & Co.
ATTORNEYS.

THE NORRIS PETERS CO., PHOTO-LITHO., WASHINGTON, D. C.

(No Model.) 5 Sheets—Sheet 3.

G. T. FARNELL.
MONEY CHANGER.

No. 569,912. Patented Oct. 20, 1896.

WITNESSES:
M. S. Cloudel
Jos. A. Ryan

INVENTOR
G. T. Farnell.
BY Munn & Co.
ATTORNEYS.

(No Model.)
G. T. FARNELL.
MONEY CHANGER.
No. 569,912. Patented Oct. 20, 1896.
5 Sheets—Sheet 4.
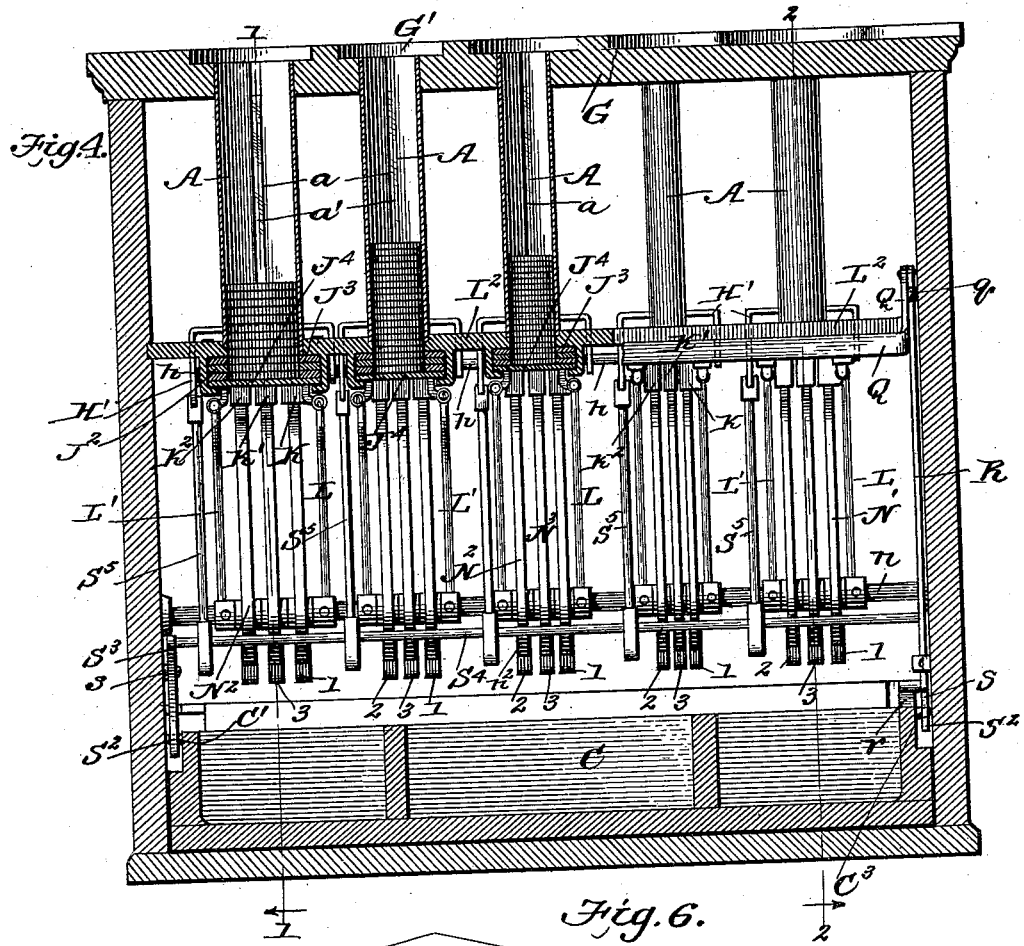
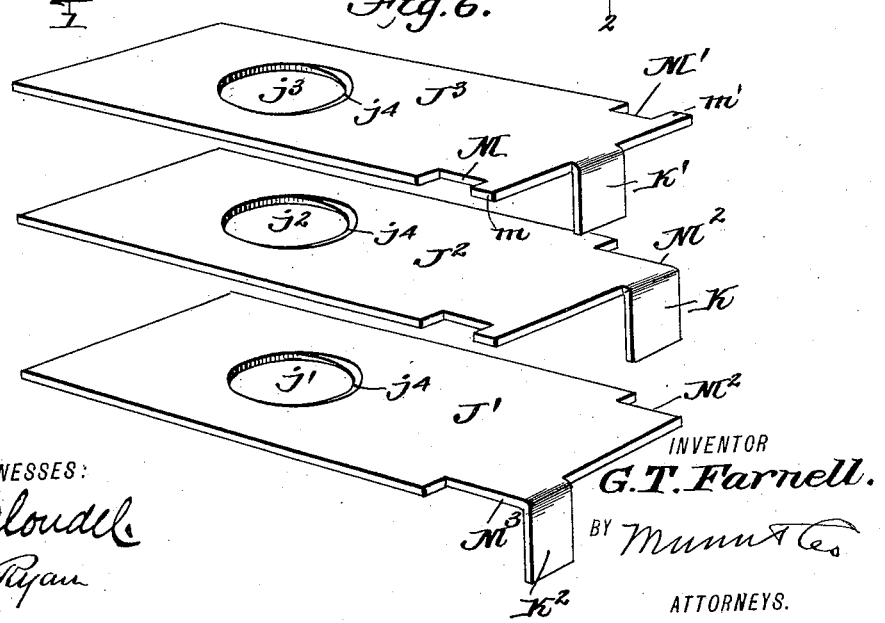
WITNESSES:
M. A. Bloudel
Jos. A. Ryan
INVENTOR
G. T. Farnell.
BY Munn & Co
ATTORNEYS.

(No Model.) 5 Sheets—Sheet 5.
G. T. FARNELL.
MONEY CHANGER.
No. 569,912. Patented Oct. 20, 1896.
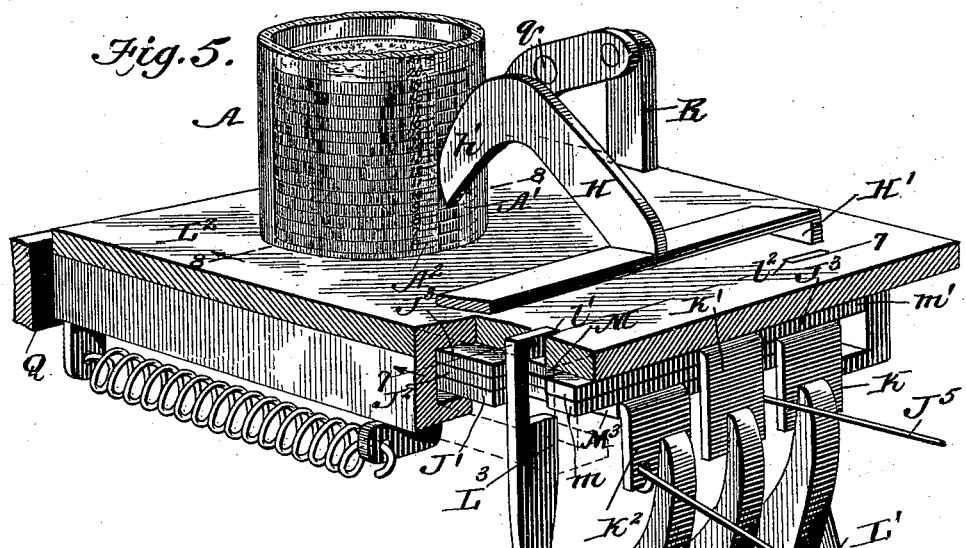
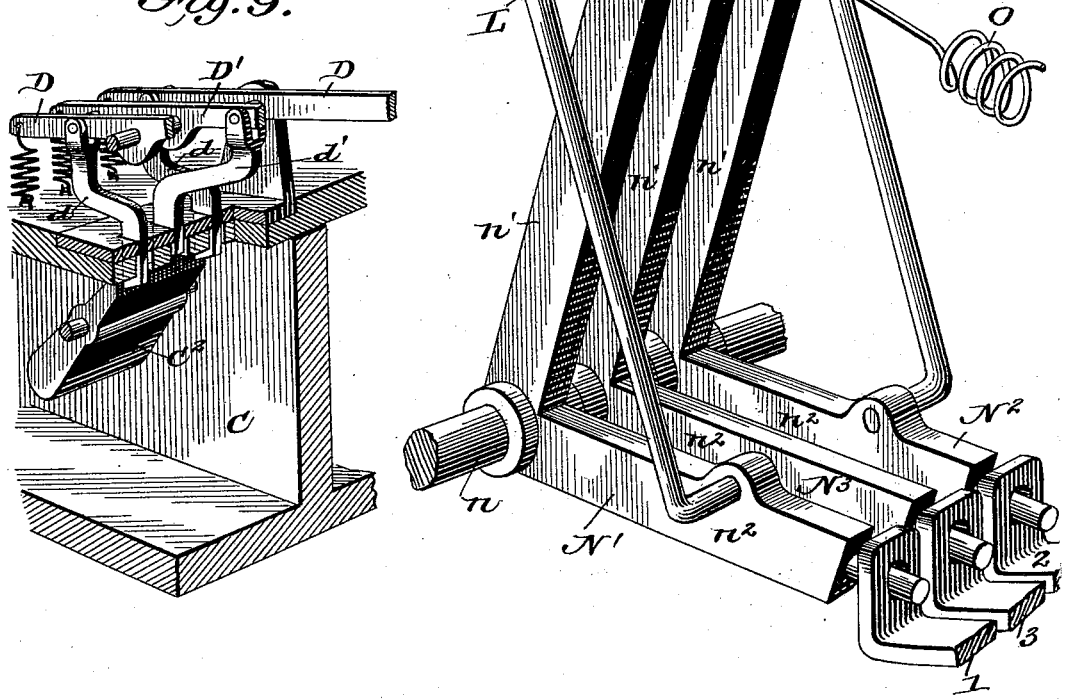
WITNESSES:
M. D. Bloudel.
Jos. A. Ryan
INVENTOR
G. T. Farnell.
BY Munn & Co
ATTORNEYS.

UNITED STATES PATENT OFFICE.

GEORGE T. FARNELL, OF BAYBOROUGH, NORTH CAROLINA.

MONEY-CHANGER.

SPECIFICATION forming part of Letters Patent No. 569,912, dated October 20, 1896.

Application filed March 30, 1893. Serial No. 585,411. (No model.)

*To all whom it may concern:*

Be it known that I, GEORGE THOMAS FARNELL, residing at Bayborough, in the county of Pamlico and State of North Carolina, have invented a new and useful Improvement in Money-Changers, of which the following is a specification.

My invention is an apparatus for use in making change, and has for an object to provide a simple, easily-operated mechanism by which to deposit in a suitable receiver one, two, or more of certain coins, or one or more of certain coins together with one or more of certain other coins to aggregate the sum of change desired to be given in any transaction; and the invention consists in certain novel constructions and combinations of parts, as will be hereinafter described, and pointed out in the claims.

Figure 1:
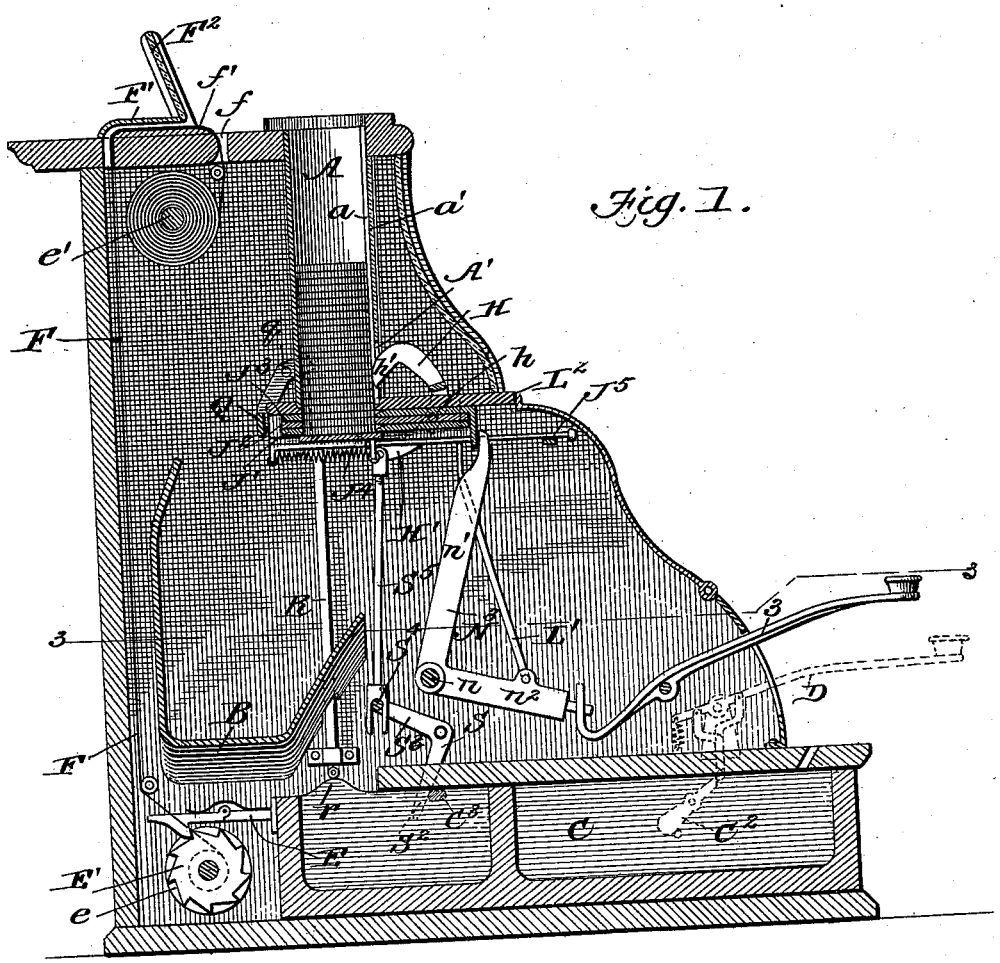
Figure 10:
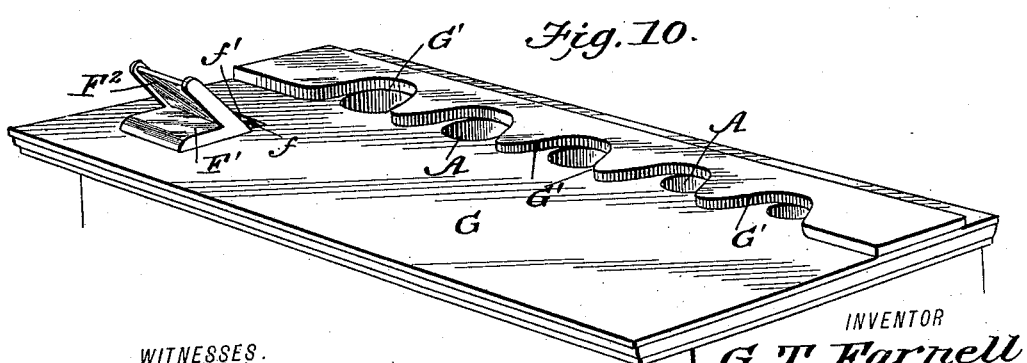
Figure 2:
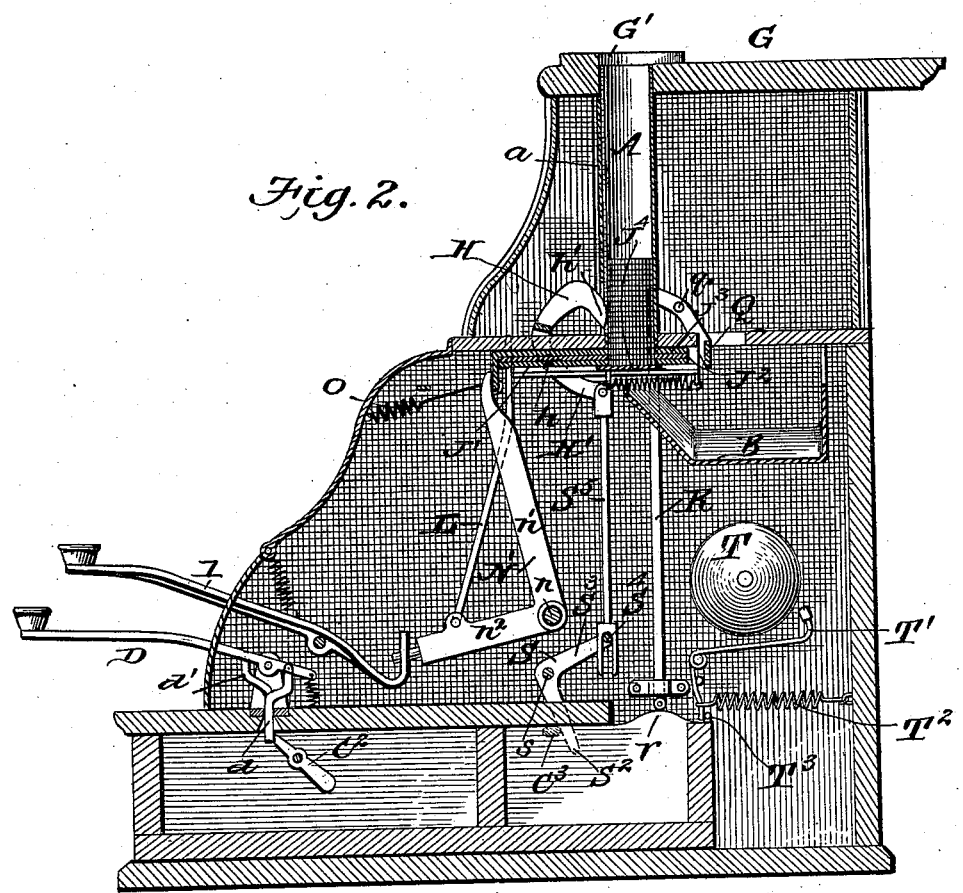
Figure 11:
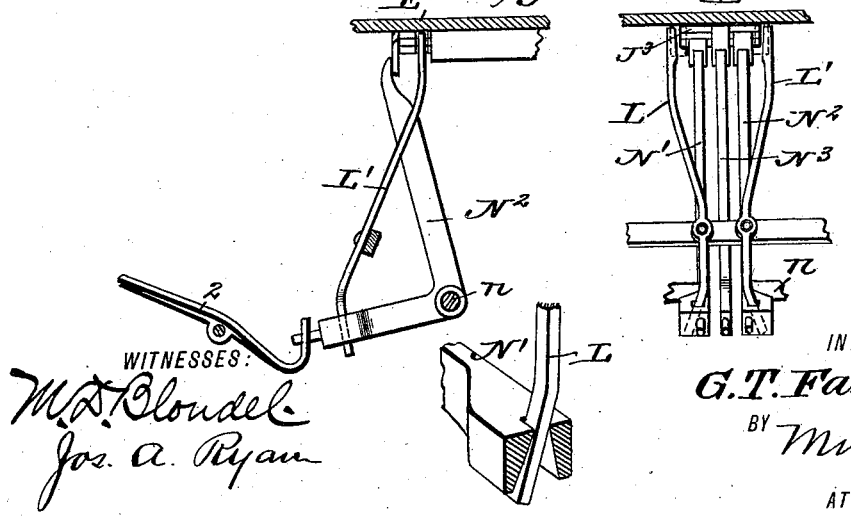
Figure 3:
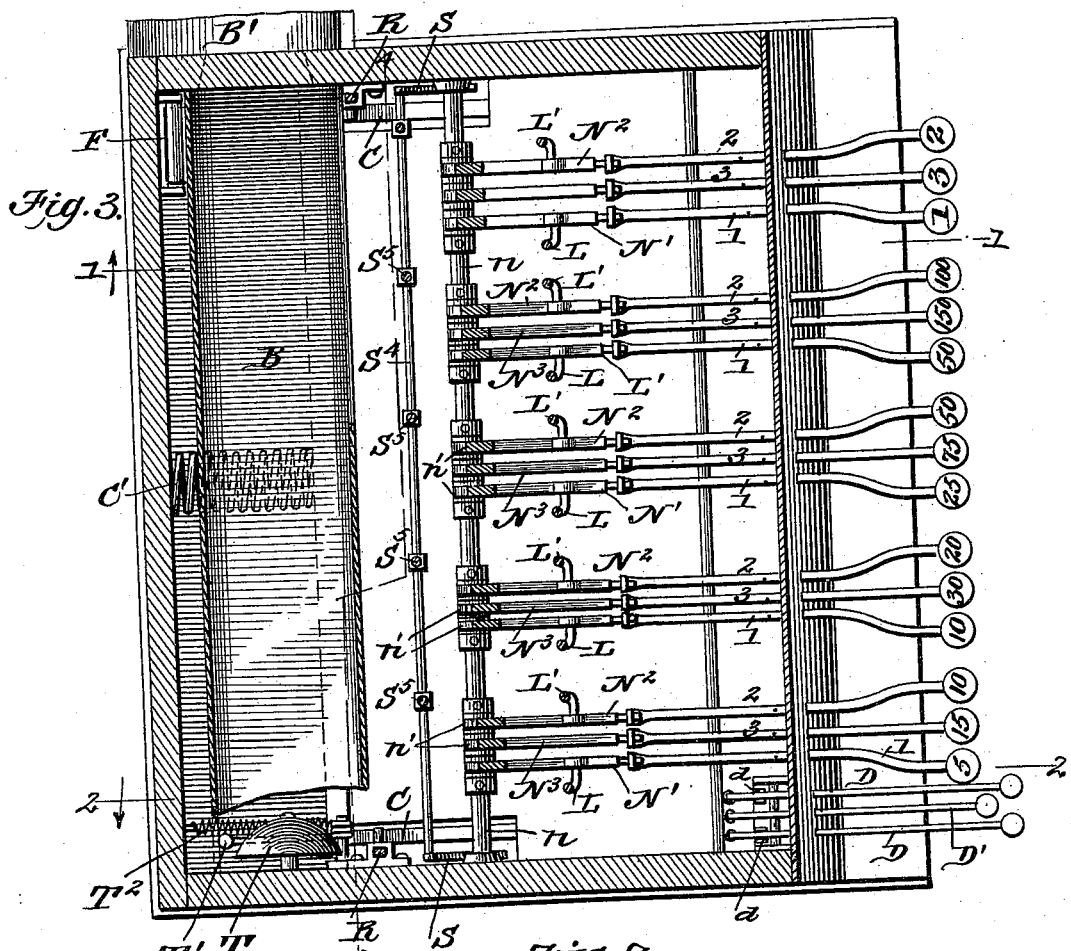
Figure 7:
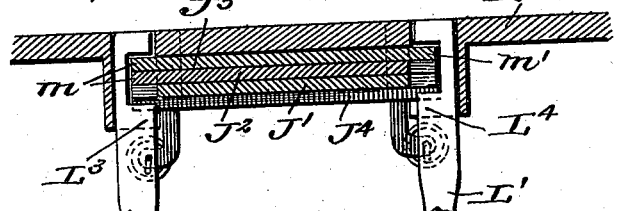
Figure 8:
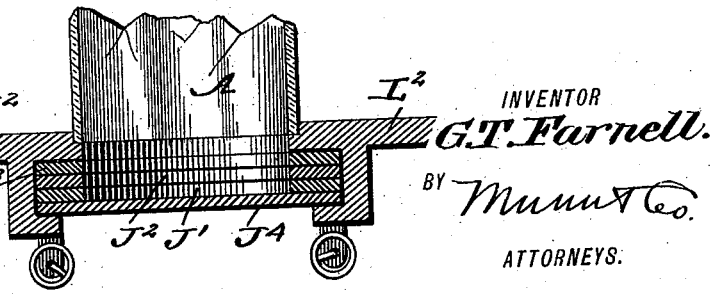

In the drawings, Figures 1 and 2 are vertical transverse sections on, respectively, lines 1 1 and 2 2 of Fig. 4. Fig. 3 is a horizontal section on about line 3 3 of Fig. 1, and Fig. 4 is a vertical longitudinal section on about line 4 4 of Fig. 3. Fig. 5 is a detail perspective view illustrating one set of slides and the keys and levers for operating the same. Fig. 6 illustrates the coin-discharging slides in detail. Figs. 7 and 8 are detail sections on, respectively, lines 7 7 and 8 8 of Fig. 5. Fig. 9 illustrates the drawer-locking mechanism in detail. Fig. 10 is a detail perspective view of the top of the casing, and Fig. 11 illustrates a modified arrangement of the detents.

In carrying out my invention I provide a suitable casing which has a number of coin-holders A, one for each denomination of coins, whether foreign or domestic, which it is desired to contain in the apparatus.

It should be understood in advance that the purpose of my invention is to facilitate the changing of money or the giving of change in any commercial transaction by enabling the instantaneous discharge into a suitable receiver. It may be a trough B, as shown, of any coin or number of coins necessary to aggregate the amount of change desired to be given. This I accomplish by providing means for the discharging into such receiver of a coin of suitable denomination or plurality of such coins or a combination of several coins which will aggregate the desired amount. In doing this I provide, in connection with suitable coin-holders, such as A, (shown,) means by which to discharge at will one or more coins and to enable the simultaneous discharge from several of such holders of one or more of the coins contained therein.

In connection with the coin-discharging devices I provide in the casing a drawer C, which may contain compartments for the several denominations of notes and also for odd coins, for which no holder A may be provided. This drawer is movable into and out of the casing and operates certain movable parts, which will be fully described hereinafter. This drawer is pressed outward when its locking devices are released by means of a spring C', bearing in rear of the drawer, as shown in Fig. 3.

To lock the drawer, I provide it with a pivoted gravity-button C², which forms an abutment for engagement by the latching-links. To lock the drawer, it is preferred to provide what may be termed a "combination lever-lock," which, while it may consist of two, four, or more levers, is preferably composed of three levers, as shown. Two of these levers D and D are normally held by their actuating-springs to throw their latch-links $d$ into position to lock the drawer, so that if both such levers D should be operated by depressing their outer ends at the same time the drawer will be released and will spring open, while if only one of such levers is so operated the other lever will still continue to lock the drawer in closed position. The third lever D' has its latching-link $d'$ arranged reversely to those $d$ of the levers D, so that its actuating-spring tends to hold the link $d'$ normally clear of the abutment in the drawer C, while the depression of such lever D' will operate to throw its link $d'$ into engagement with the abutment in the drawer. The result of this is that while the depression of both levers D will release the drawer the depression of either one of such levers either alone or in connection with the lever D' or the depression of the lever D' alone will not release the drawer. This forms a simple form of lock, which may be quickly operated by one informed as to the combination, while a stranger to such combination would likely so operate the levers as to lock rather than unlock the drawer. To this drawer I connect a pawl E, which engages a ratchet E' on a roller e, which receives one end of a recording-strip F, the other end of which is wound on a roller e'. This recording-strip F extends from the roller e' up through an opening f in the top of the casing, extends for a short distance along such top, and then extends under a glass pane F', thence down and over suitable guide-rollers to the lower roll e, upon which it is wound by a step-by-step action with each successive opening movement of the drawer. In operation, as each transaction is effected the operator will write with a pencil or other marker upon the recording-strip at f'. Then the drawer will be opened and such movement will adjust the mark which has been made upon the recording-strip at f' forward under the glass pane F', so that it cannot be tampered with by the operator. In order that such amount may be exhibited to a person considerably in advance of the machine, I provide a mirror F², arranged to receive a reflection of the amount recorded on the record-strip after such amount has passed under the glass F', so such amount as reflected in the mirror may be seen by a person some distance from the machine. It is true the reflection of such amount in the mirror will be reversed or a negative, but such reproductions are easily read with slight practice and would require but a short use by the proprietor or other supervising person to enable them to read such recorded amounts in the negative as readily as if written in usual manner. The coin-holders range in a series opening out of the top of the machine, and in order that coins may be quickly deposited into the open ends of the holders I provide diverging guideways leading from such holders toward the front of the machine and leave in advance of such guideways a sufficient expanse of top at G, whereby a number of coins placed on such top may be separated and divided into the several denominations corresponding to the coin-holders and then quickly deposited into such coin-holders by the aid of the diverging guideways G', as will be readily understood from Fig. 10.

The coin-holders A may be made of glass or other transparent material, as shown in Fig. 5, or they may be made of metal, having a longitudinal sight slot a, which may be covered by a glass pane a', and in each case I prefer to graduate the coin-holders to indicate the number of coins therein, as will be understood from A². Near their lower ends the coin-holders are provided with longitudinal slots A', in which operate the indicators H, the purpose of which will be more fully described hereinafter. At or adjacent to the lower ends of the coin-holders I provide the guides for the coin-discharging slides. These guides range from front to rear, are closed immediately below the coin-holders, and are so arranged in rear of such coin-holders as to offer no obstruction to the discharge of the coin after it has been pushed to a point in rear of the coin-holder.

The coin-discharging slides J', J², and J³ are arranged in series. Preferably I employ three of the slides, but it is manifest that the invention may be embodied in fewer or more slides, as may prove desirable in the practical use of the machine, the purpose being to provide slides and means for manipulating the same whereby the operator may discharge one, two, or more of the particular coins desired. In carrying out this feature of my invention I prefer to arrange the discharging-slides one above the other below the coin-holder, employing the lowermost slide to discharge one coin, the next upper slide, together with the first, to discharge two coins, the next upper slide, together with those below, to discharge three coins, and so on if more than three slides are employed. I also prefer to so construct each slide after the first that it will operate with it the preceding slide or slides, that is to say, the second slide will, when operated, carry the first slide with it, the third slide, when operated, will carry with it both the second and first slides, and so on. The slides J', J², and J³ are each provided with openings lettered $j'$, $j^2$, and $j^3$. These openings are adapted to receive the particular coin for which the corresponding holder is fitted, and in order that the device, when used with worn coins, may not be clogged thereby I provide the front upper edges of the walls of openings $j'$, $j^2$, and $j^3$ with beveled portions $j^4$ $j^4$ $j^4$, which tend to obviate any difficulty because of worn coins by lifting an additional coin so it will not clog the next upper slide. This will be best understood from Figs. 1 and 6.

The slide J² has a portion K overlapping the lower slide, and the slide J³ has a portion K' overlapping the middle slide, so that the rearward movement of the second or middle slide will also operate the first or lower slide, and the rearward movement of the third or upper slide will also operate both the second and first slides, while such rearward movement of the second slide will not operate the third slide, nor will such movement of the first slide positively operate the second slide. To avoid any movement of the second or third slides by frictional contact with the next lower slide, I provide the detents L' for the upper or third slide and L for the second and third slides, such detent L being connected with the devices for operating the first slide and the detent L' being connected with the device for operating the second slide, and the detent L is thrown by the said operating devices of the first slide into position to engage the second slide, while the detent L' is thrown by the said operating devices of the second slide into position to engage the third slide.

In the particular construction shown the detents L L' slide through openings $l'$ $l^2$ in a frame-plate $L^2$, upon which the coin-holders are supported, and the second and third slides have notches M with closed ends $m$ for engagement by the detent L, while the third slide $J^3$ has a notch M' with a closed end $m'$ for engagement by the detent L', the slides J' and $J^2$ having open-ended notches $M^2$ for the detent L' and the slide J' having an open-ended notch $M^3$ for the detent L.

The detent L moves up and engages at $L^3$ with the second and third slides, while the detent L' moves up and engages at $L^4$ with the third slide, such movement of the detents L L' being effected by the operation of the devices which operate the first and second slides, as before referred to.

While the movements of the detents may be effected in various ways, such, for instance, as shown in Fig. 11, wherein they work laterally, it is preferred to arrange them as shown in the other figures, where they connect at their lower ends with the forwardly-projecting arms of the bell-crank levers which operate the respective slides. For each set of slides I provide independent bell-crank levers N' $N^2$ $N^3$, pivoted at $n$ and having upwardly-projecting arms $n'$, which engage their respective slides and forwardly-projecting arms $n^2$, which are operated by the corresponding keys 1, 2, and 3. The operation of key 1 discharges one coin, of key 2 two coins, and of key 3 three coins, and so on if more than three discharging-slides are used.

In the construction shown the levers N' $N^2$ $N^3$ bear against the portions $K^2$, K, and K' of the slides J' $J^2$ $J^3$. To the slide J', I connect the retracting-spring O, by which it may be drawn back to position below the coin-holders, and the return of the said slide insures the return of the slides $J^2$ and $J^3$, as will be readily understood. By the operation of this construction it will be seen that if the key 1 be depressed it will throw its slide J' to discharge a coin and at the same time operate the detent L to lock the slides $J^2$ and $J^3$ from moving. To discharge two slides, the key 2 should be depressed, which will throw the slide $J^2$ and also operate the detent L' to lock the slide $J^3$, and so hold the said slide from moving; and to discharge three coins the key 3 should be depressed. The coins as discharged are received in an inclined chute B, extended below the discharge-slides of the several coin-holders and are carried by the said chute to the receiver B', whence they can be taken by the operator or the customer, as may be most convenient.

It is desired that the coin-slides should not be operated except when the drawer is opened. To this end I provide a lock operated by the drawer and consisting of a bar Q, pivotally supported at $q$ and movable into and out of a position alongside the discharge ends of all the slides and operating when alongside the same to lock such slides from movement. This is the position of the bar Q when the drawer is closed, being held in such position by means of a vertically-sliding rod R, connected with the bar and extending down in position to be pressed upward by a cam-like portion $r$ on the drawer when the drawer is closed and so lock the slides J', $J^2$, and $J^3$ from movement. When the drawer is opened, the rod R drops by gravity and the locking-bar offers no obstruction to the movement of the coin-discharging slides.

In order to prevent the operation of the slides when there is no coin to be discharged thereby, as will occur when the coins in the holder fall to a level below that of such slide or slides, I provide the indicators H, one for each of the coin-holders, such indicators being pivoted at $h$ and arranged at their points $h'$ to pass through the slots A' in the coin-holders and bear either against the edges of the coins when the coins extend above the said indicators or upon the upper coin when the coins have fallen below the level of the indicator. Thus in operation it will be seen the indicator will rest upon and follow the coins down until the uppermost coin passes into position for operation by the second slide $J^2$. Then the indicator will project into position for engagement by the upper slide $J^3$ and will serve as a detent to prevent the operation of such slide when there is no coin to be discharged thereby. The indicator operates similarly in connection with the slides $J^2$ and J' when the coins have fallen below the level of such slides. To permit the refilling of the coin-holders, I provide devices by which the indicators may be held out of operative position when the drawer is closed. These consist of a bell-crank lever or levers S, pivoted at $s$, having an arm $S^2$, arranged for abutment by a portion $C^3$ on the drawer, and an arm $S^3$, which operates a cross-shaft $S^4$, which is arranged to operate the rods $S^5$, depending from the arms H' of the indicators and arranged, when the drawer is closed, to throw the indicator clear of the coins and coin-passage in the holders. This construction also prevents the indicator from impeding or interfering with the free passage of the coins down the holder.

As an annunciator I provide the bell T, arranged for operation by a hammer T', actuated in one direction by the spring $T^2$ and in the other direction by a projection $T^3$ on the drawer, so the bell will be sounded each time the drawer is opened.

It will be understood that my invention is useful and important in all cases where it is desired to make change, to count money, to make money up into packages, or for other purposes where it is desired to supply at will one or any suitable number of any denomination or denominations of coins.

Below the slide J', I arrange a bottom plate $J^4$, which may be drawn by a wire $J^5$ or other suitable means to empty the coin-holder at one stroke. This may be desirable in securing a large amount of change at once and for relieving the machine in case it should become clogged by a battered coin or other object.

Having thus described my invention, what I claim, and desire to secure by Letters Patent, is—

1. In an apparatus, substantially as described, the combination of the plurality of slides, independently-operating devices for operating the said slides, and a detent arranged for operation by the operating devices of one slide and adapted to lock the succeeding slide from accidental movement as the preceding slide is positively operated substantially as set forth.

2. In an apparatus substantially as described, the combination of a series of coin-discharging slides, independently-operating devices for operating the said slides, and a detent movable by the operating devices of one slide into locking engagement with a succeeding slide whereby to lock such slides from movement substantially as shown and described.

3. In an apparatus substantially as described, the combination of the coin-holder, the three coin-discharging slides arranged in series below the same, separate mechanism for operating the first slide, the first two slides, and all three slides, and detent devices by which the second and third slides are locked from movement when respectively only the operating devices of the first, and first and second slides are operated, the detents being connected with their respective operating devices, substantially as shown and described.

4. In an apparatus substantially as described, the combination of the coin-holder, the three slides below the same, the upper slide being provided in its opposite edges with stop-notches for the two detents, and with a depending tongue or flange overlapping both the second and first slides, the second slide having a stop-notch in one edge and an open-ended notch in its other edge and having a tongue or flange overlapping the first slide, such first slide being provided with open-ended notches in both edges, the detents operating in said notches, and means for operating said detents substantially as set forth.

5. In an apparatus substantially as described, the combination of the drawer, the coin-holder, the discharging slide or slides, an indicator by which to lock the slide or slides from operation when the coins have fallen below the level thereof, the drawer, and means by which the closing of the drawer may adjust the indicator clear of the coin-holder to permit the filling of such holder substantially as set forth.

6. An apparatus substantially as described comprising a coin-holder, a plurality of discharging-slides each slide after the first being provided with a projecting portion overlapping the preceding slide and the devices independent of said slides for operating the same, such devices being arranged to engage the projecting portions of their respective slides, whereby said portions form bearings for the operating devices and constitute means for securing the movements of the preceding slides substantially as set forth.

7. In an apparatus substantially as described the combination of a series of overlying coin-discharging slides means whereby they may be moved a detent means whereby the detent may be moved at right angles to the plane of said slides to prevent the operation of any slide from accidentally operating any succeeding slide the latter having a part to abut said detent substantially as set forth.

8. The combination in an apparatus substantially as described, of the overlying slides having notched edges the detents operating in said notches and devices whereby the said slides and detents may be operated substantially as shown and described.

9. In an apparatus substantially as described the combination of the slides having notched edges, the detents operating in said notches and movable at right angles to the planes of the slides, and independently-operating devices for operating the said slides said devices being also connected with and operating the detents substantially as shown and described.

10. In an apparatus substantially as described the combination of the slides, the bell-crank levers having arms engaging said slides and the detents connected with the other arms of said levers and movable into engagement with the slides substantially as shown and described.

11. An apparatus substantially as described comprising a series of coin-holders, coin-discharging slides controlling said holders, a lock-bar movable into and out of position to hold the slides of the several holders from movement, the drawer and means whereby the movements of the drawer operate the locking-bar, substantially as set forth.

12. In an apparatus substantially as described, the combination of a series of coin-holders, coin-discharging slides controlling said holders, a pivoted lock-bar swinging into and out of position to hold the slides of the several holders from movement, a sliding rod connected with said lock-bar and the drawer having a cam-like portion engaging said sliding rod substantially as shown and described.

13. In an apparatus substantially as described, the combination of the coin-holder, devices for discharging the coins, the drawer, an indicator movable upon the coins and arranged to lock the slide or slides from movement, and intermediate devices between said indicator and drawer whereby the latter in one position may free the indicator substantially as shown and described.

14. In an apparatus substantially as described, the combination of the coin-holder, devices for discharging the coins, the drawer, an indicator pivoted between its ends and having one arm movable into the holder and arranged to rest upon the coins and to lock the slide or slides from movement when the coins have fallen below the level thereof, a rod connected with the other arm of said lever and devices between said rod and the drawer whereby the movements of the latter operate the indicator substantially as shown and described.

GEORGE T. FARNELL.

Witnesses:
SOLON C. KEMON,
PERRY B. TURPIN.